United States Patent
Smith et al.

(10) Patent No.: US 10,365,824 B2
(45) Date of Patent: Jul. 30, 2019

(54) SILENT ACTIVE PAGE MIGRATION FAULTS

(71) Applicants: Advanced Micro Devices, Inc., Sunnyvale, CA (US); ATI Technologies ULC, Markham (CA)

(72) Inventors: Wade K. Smith, Sunnyvale, CA (US); Anthony Asaro, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 88 days.

(21) Appl. No.: 15/495,296

(22) Filed: Apr. 24, 2017

(65) Prior Publication Data

US 2018/0307414 A1  Oct. 25, 2018

(51) Int. Cl.
*G06F 3/06* (2006.01)
*G06F 12/1009* (2016.01)
*G06F 12/1027* (2016.01)

(52) U.S. Cl.
CPC .......... *G06F 3/0604* (2013.01); *G06F 3/0647* (2013.01); *G06F 3/0683* (2013.01); *G06F 12/1009* (2013.01); *G06F 12/1027* (2013.01); *G06F 2212/657* (2013.01); *G06F 2212/68* (2013.01)

(58) Field of Classification Search
CPC ................. G06F 12/1009; G06F 12/08; G06F 2212/684; G06F 2212/301; G06F 12/122; G06F 12/0804; G06F 2212/251; G06F 12/1027; G06F 2212/657; G06F 2212/68; G06F 3/0604; G06F 3/0647; G06F 3/0683

USPC ....................................................... 711/165
See application file for complete search history.

(56) References Cited

U.S. PATENT DOCUMENTS

| | | | |
|---|---|---|---|
| 6,282,614 B1 | 8/2001 | Musoll | |
| 7,669,011 B2 | 2/2010 | Conway | |
| 8,499,066 B1 | 7/2013 | Zhang et al. | |
| 10,067,709 B2 | 9/2018 | Piga et al. | |
| 10,089,014 B2 | 10/2018 | Uppal et al. | |
| 2005/0081181 A1 | 4/2005 | Brokenshire et al. | |

(Continued)

OTHER PUBLICATIONS

Hwang, Kai, "Advanced Computer Architecture: Parallelism, Scalability, Programmability", 2011, 2nd Ed., pp. 17-29, 52-55, McGraw-Hill.

(Continued)

*Primary Examiner* — Hashem Farrokh
(74) *Attorney, Agent, or Firm* — Meyertons Hood Kivlin Kowert and Goetzel PC; Rory D. Rankin (57) ABSTRACT

Systems, apparatuses, and methods for migrating memory pages are disclosed herein. In response to detecting that a migration of a first page between memory locations is being initiated, a first page table entry (PTE) corresponding to the first page is located and a migration pending indication is stored in the first PTE. In one embodiment, the migration pending indication is encoded in the first PTE by disabling read and write permissions. If a translation request targeting the first PTE is received by the MMU and the translation request corresponds to a read request, a read operation is allowed to the first page. Otherwise, if the translation request corresponds to a write request, a write operation to the first page is blocked and a silent retry request is generated and conveyed to the requesting client.

20 Claims, 7 Drawing Sheets

(56) References Cited

U.S. PATENT DOCUMENTS

| | | | |
|---|---|---|---|
| 2009/0150624 | A1 | 6/2009 | Resnick |
| 2009/0222625 | A1 | 9/2009 | Ghosh et al. |
| 2009/0271596 | A1 | 10/2009 | Barsness et al. |
| 2010/0250856 | A1 | 9/2010 | Owen et al. |
| 2012/0023280 | A1* | 1/2012 | Lais .................. G06F 13/28 710/308 |
| 2012/0023302 | A1* | 1/2012 | Arndt .................. G06F 13/28 711/165 |
| 2012/0059983 | A1 | 3/2012 | Nellans et al. |
| 2012/0233486 | A1 | 9/2012 | Phull et al. |
| 2013/0036266 | A1 | 2/2013 | Naganuma et al. |
| 2014/0281299 | A1* | 9/2014 | Duluk, Jr. ............. G06F 12/122 711/160 |
| 2014/0281365 | A1* | 9/2014 | Mashey .............. G06F 12/1009 711/207 |
| 2014/0365738 | A1 | 12/2014 | Hod et al. |
| 2015/0006785 | A1 | 1/2015 | Jayaraman et al. |
| 2015/0052287 | A1 | 2/2015 | Venkatasubramanian et al. |
| 2015/0088805 | A1 | 3/2015 | Kakarla et al. |
| 2016/0378655 | A1 | 12/2016 | Blagodurov et al. |
| 2016/0378674 | A1* | 12/2016 | Cheng ................. G06F 12/1009 711/206 |
| 2017/0262216 | A1 | 9/2017 | Polkovnikov et al. |
| 2018/0074715 | A1 | 3/2018 | Farmahini-Farahani et al. |

OTHER PUBLICATIONS

Patterson et al., "Computer Organization and Design: The Hardware/Software Interface", 2014, 5th Ed, pp. 509-510, 519-520, 531-533, Elsevier.

McCreary et al., "Automatic Determination of Grain Size for Efficient Parallel Processing", Sep. 1989, pp. 1073-1078, vol. 32, Issue 9.

Maheshwari, Piyush, "Improving granularity and locality of data in multiprocessor execution of functional programs", Parallel Computing, Dec. 1996, pp. 1359-1372, vol. 22, Issue 10, Elsevier B.V.

Kruatrachue et al., "Grain Size Determination for Parallel Processing", IEEE Software, Jan. 1988, pp. 23-32, vol. 5, Issue 1, IEEE Computer Society Press Los Alamitos, CA, USA.

=Rigid, et al., "FFTW: An Adaptive Software Architecture for the FFT", Proceedings of the 1998 IEEE International Conference on Acoustics, Speech and Signal Processing, May 15, 1998, 4 pages.

Volos, et al., "BuMP: Bulk Memory Access Prediction and Streaming", in Proceedings of the 47th Annual IEEE/ACM International Symposium on Microarchitecture, Dec. 13-17, 2014, 13 pages.

Kaseridis, et al., "Minimalist Open-page: A DRAM Page-mode Scheduling Policy for the Many-core Era", Proceedings of the 44th Annual IEEE/ACM International Symposium on Microarchitecture, Dec. 3-7, 2011, 12 pages, ACM, New York, NY, USA.

Awasthi, et al., "Prediction Based DRAM Row-Buffer Management in the Many-Core Era", International Conference on Parallel Architectures and Compilation Techniques, Oct. 10-14, 2011, 2 pages.

Erlingsson, et al., "A Cool and Practical Alternative to Traditional Hash Tables", Proc. 7th Workshop on Distributed Data and Structures (WDAS'06), Jan. 2006, 6 pages.

Qiao et al., "Fast Bloom Filters and Their Generalization", IEEE Transactions on Parallel and Distributed Systems, Jan. 2014, pp. 93-103, vol. 25, Issue 1, IEEE Computer Society, Washington, D.C., USA.

Breternitz et al., "A Segmented Bloom Filter Algorithm for Efficient Predictors", Proceedings of the 2008 20th International Symposium on Computer Architecture and High Performance Computing, Oct. 29, 2008, pp. 123-130, IEEE Computer Society, Washington, D.C., USA.

Gutierrez, Anthony Thomas, U.S. Appl. No. 15/649,312, entitled "Predicting Page Migration Granularity for Heterogeneous Memory Systems", filed Jul. 13, 2017, 25 pages.

Non-Final Office Action in U.S. Appl. No. 15/649,312, dated Aug. 7, 2018, 36 pages.

* cited by examiner

SILENT ACTIVE PAGE MIGRATION FAULTS

BACKGROUND

Description of the Related Art

Many computing devices use a virtual memory technique for handling data accesses by software programs. A virtual memory page-translation mechanism enables system software to create separate address spaces for each process or application. These address spaces are known as virtual address spaces. The system software uses the paging mechanism to selectively map individual pages of physical memory into the virtual address space using a set of hierarchical address-translation tables known collectively as page tables. Virtual memory can be implemented with any processor, including, but not limited to, a central processing unit (CPU), a graphics processing unit (GPU), and an accelerated processing unit (APU).

When data is accessed by a program, a block of memory of a given size (e.g., 4 kilobytes (KB)) that includes the data, called a "page" of memory, is copied from backing storage (e.g., a disk drive or semiconductor memory) to an available physical location in a main memory in the computing device. Some systems have multiple different page sizes stored in memory. Rather than having programs manage the physical locations of the pages, a memory management unit in the computing device manages the physical locations of the pages. Instead of using addresses based on the physical locations of pages (or "physical addresses") for accessing memory, the programs access memory using virtual addresses in virtual address spaces. From a program's perspective, virtual addresses indicate the actual physical addresses (i.e., physical locations) where data is stored within the pages in memory and hence memory accesses are made by programs using the virtual addresses. However, the virtual addresses do not directly map to the physical addresses of the physical locations where data is stored. Thus, as part of managing the physical locations of pages, the memory management unit translates the virtual addresses used by the programs into the physical addresses where the data is actually located. The translated physical addresses are then used to perform the memory accesses for the programs. To perform the above-described translations, the memory management unit uses page tables in memory that include a set of translations from virtual addresses to physical addresses for pages stored in the memory.

From time to time, a system can migrate pages between memory locations, causing the virtual-to-physical address translations to change. In some cases, a system determines to move a page from a first memory to a second memory. Alternatively, the system can move pages within a single memory as part of garbage collection operations. However, while a process is running (e.g., a graphics program performing a rendering task), migrating pages can be disruptive.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for migrating pages between memory locations are disclosed herein. In one embodiment, a system includes at least one processor, a memory management unit (MMU), and a memory subsystem. In one embodiment, an indication that a first page will be migrated from a first memory location to a second memory location in the memory subsystem is detected. Prior to migrating the first page, a first page table entry (PTE) corresponding to the first page is located. Then, a migration pending indication is stored in the first PTE. In one embodiment, the migration pending indication is encoded in the first PTE by disabling the read and write permissions for the first page. After the migration pending indication is stored in the first PTE, migration of the first page can be initiated.

In one embodiment, a translation request targeting the first PTE is received by the MMU while the migration pending indication is encoded in the first PTE. If the translation request corresponds to a read request, a read operation is allowed to be performed to the first page. Otherwise, if the translation request corresponds to a write request targeting the first page, a write operation is prevented from being performed to the first page and a silent retry request is generated and conveyed to the requesting client. In one embodiment, the silent retry is referred to as "silent" since it does not include generating an interrupt or updating status registers. Accordingly, the requesting client is configured to retry the write request at a later point in time.

Figure 1:
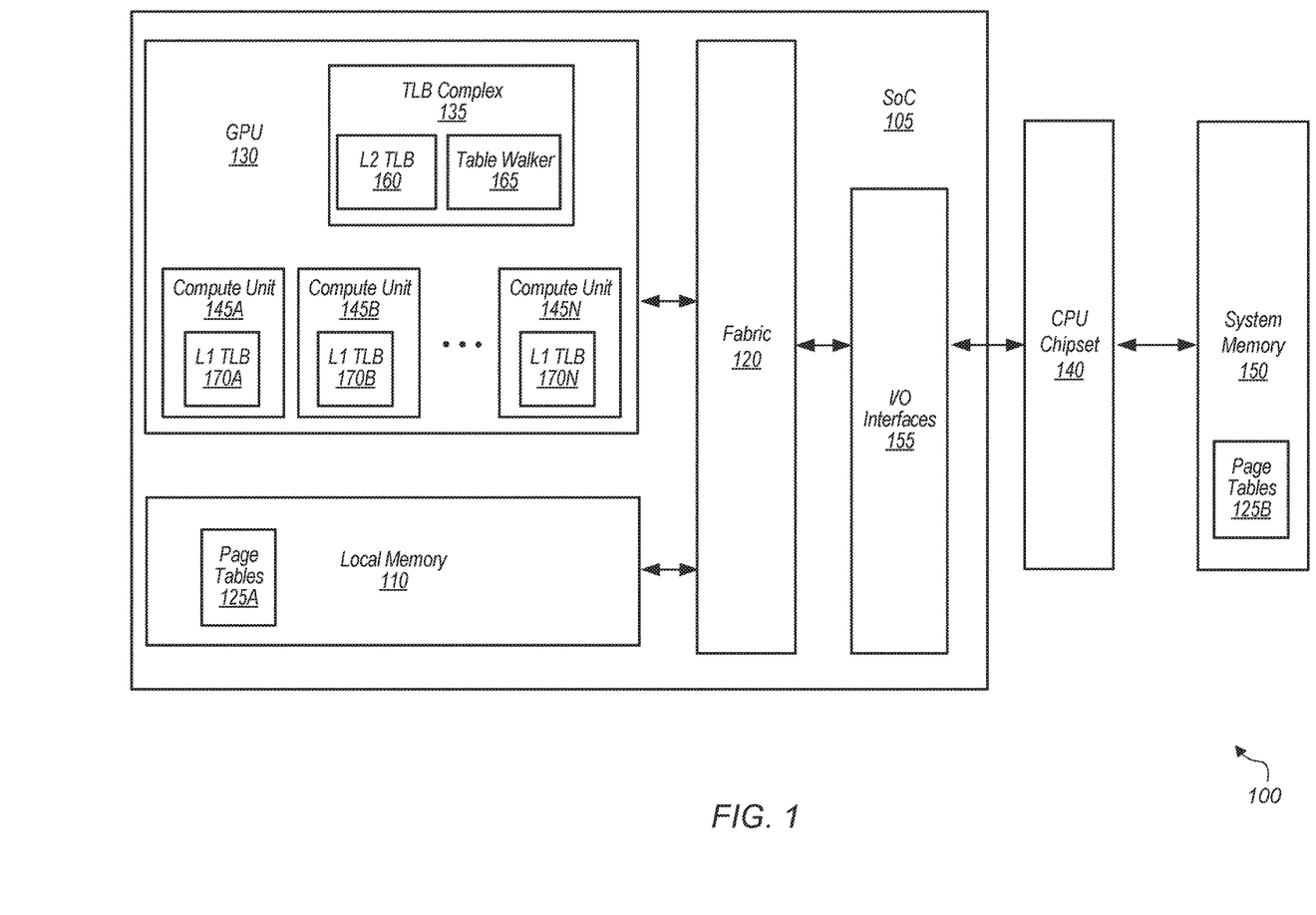
FIG. 1 is a block diagram of one embodiment of a computing system.

Referring now to FIG. 1, a block diagram of one embodiment of a computing system 100 is shown. In one embodiment, computing system 100 includes system on chip (SoC) 105 coupled to system memory 150 via central processing unit (CPU) chipset 140. SoC 105 can also be referred to as an integrated circuit (IC). In one embodiment, SoC 105 includes at least input/output (I/O) interfaces 155, fabric 120, graphics processing unit (GPU) 130, and local memory 110. SoC 105 can also include other components not shown in FIG. 1 to avoid obscuring the figure. In another embodiment, GPU 130 can be another type of processing unit (e.g., central processing unit (CPU), application specific integrated circuit (ASIC), field programmable gate array (FPGA), digital signal processor (DSP)).

GPU 130 includes at least translation lookaside buffer (TLB) complex 135 and compute units 145A-N which are representative of any number and type of compute units that are used for graphics or general-purpose processing. GPU 130 is coupled to local memory 110 via fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 uses TLBs to cache mappings of virtual addresses to physical addresses for the virtual addresses that are allocated to different processes executing on these devices. These TLBs are shown as L1 TLBs 170A-N in compute units 145A-N, respectively, and L2 TLB 160 in TLB complex 135. TLB complex 135 also includes table walker 165. Generally speaking, a memory management unit may include one or more TLBs, table walking logic, fault handlers, and circuitry depending on the implementation. In some embodiments, different TLBs can be implemented within GPU 130 for instructions or data. For example, a relatively small and fast L1 TLB is backed up by a larger L2 TLB that requires more cycles to perform a lookup. The lookup performed by an L2 TLB is relatively fast compared to a table walk to page tables 125A-B. Depending on the embodiment, page tables 125A-B can be located in local memory 110, system memory 150, or portions of page tables 125A-B can be located in local memory 110 and system memory 150. Some embodiments of a TLB complex include an instruction TLB (ITLB), a level one data TLB (L1 DTLB), and a level two data TLB (L2 DTLB). Other embodiments of a TLB complex can include other configurations and/or levels of TLBs.

An address translation for a load instruction or store instruction in GPU 130 can be performed by posting a request for a virtual address translation to a L1 TLB. The L1 TLB returns a physical address if the virtual address is found in an entry of the L1 TLB. If the request for the virtual address translation misses in the L1 TLB, then the request is posted to the L2 TLB. If the request for the virtual address translation misses in the L2 TLB, then a page table walk is performed for the request. A page table walk can result in one or more lookups to the page table hierarchy.

The process of moving pages from system memory 150 to local memory 110 or vice versa is referred to herein as "page migration". Additionally, moving pages within system memory 150 or moving pages within local memory 110 is also referred to herein as "page migration". The combination of local memory 110 and system memory 150 can be referred to herein as a "memory subsystem". Alternatively, either local memory 110 or system memory 150 can be referred to herein as a "memory subsystem". System 100 is configured to generate an indication that a given page is in a page migration state when the given page is going to be moved between locations in the memory subsystem. This allows other operations to continue seamlessly. In one embodiment, system 100 is configured to modify the page table entry for the given page and turn off both the read and write privileges when the given page is in a page migration state. The meaning of this particular combination (read and write privileges disabled) has been changed to indicate that the given page is in a page migration state. In other embodiments, other ways of encoding that the given page is in a page migration state are possible and are contemplated.

As used herein, the term "page" is defined as a fixed-length contiguous block of virtual memory. A "page" is also defined as a unit of data utilized for memory management by system 100. The size of a page can vary from embodiment to embodiment, and multiple different page sizes can be utilized in a single embodiment. It should be understood that the terms "memory page" and "page" are intended to represent any size of memory region.

In one embodiment, in response to detecting that a migration of a first page between memory locations is being initiated, a first page table entry (PTE) corresponding to the first page is located and a migration pending indication is stored in the first PTE. In one embodiment, the migration pending indication is encoded in the first PTE by disabling read and write permissions. If a translation request targeting the first PTE is received by the MMU while the migration pending indication is encoded in the first PTE and the translation request corresponds to a read request, a read operation is allowed to the first page. Otherwise, if the translation request corresponds to a write request, a write operation to the first page is prevented and a silent retry request is generated and conveyed to the requesting client. The requesting client can then retry the write request at a later point in time. In another embodiment, the read request is blocked and a retry request is generated for the read operation if the translation request corresponds to a read request.

I/O interfaces 155 are coupled to fabric 120 and to CPU chipset 140, and I/O interfaces 155 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). SoC 105 is coupled to memory 150 via CPU chipset 140, with memory 150 including one or more memory modules. Each of the memory modules includes one or more memory devices mounted thereon. In some embodiments, memory 150 includes one or more memory devices mounted on a motherboard or other carrier upon which SoC 105 is also mounted. In one embodiment, memory 150 is used to implement a random access memory (RAM) for use with SoC 105 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 150 includes (but is not limited to) double data rate (DDR) DRAM, DDR2 DRAM, DDR3 DRAM, and so forth.

In various embodiments, computing system 100 can be a computer, laptop, mobile device, server or any of various other types of computing systems or devices. It is noted that the number of components of computing system 100 and/or SoC 105 can vary from embodiment to embodiment. There can be more or fewer of each component/subcomponent than the number shown in FIG. 1. For example, in another embodiment, SoC 105 can include multiple memory controllers coupled to multiple memories. It is also noted that computing system 100 and/or SoC 105 can include other components not shown in FIG. 1. For example, in another embodiment, SoC 105 can also include a central processing unit (CPU) with one or more processor cores. Additionally, in other embodiments, computing system 100 and SoC 105 can be structured in other ways than shown in FIG. 1.

Figure 2:
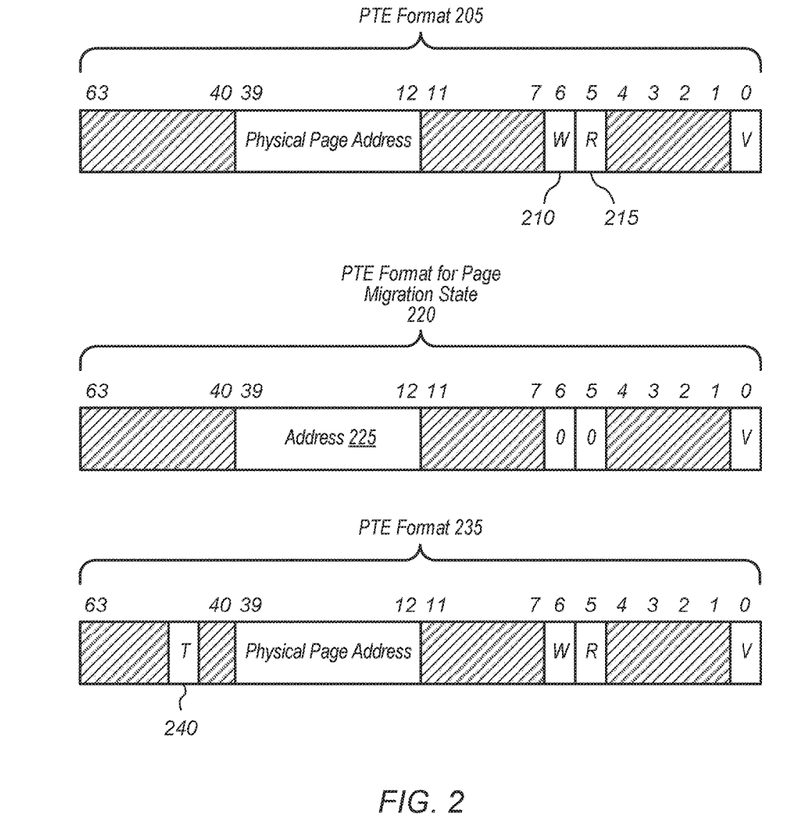
FIG. 2 illustrates examples of page table entry (PTE) formats.

Turning now to FIG. 2, examples of page table entry (PTE) formats are shown. PTE format 205 at the top of FIG.

2 illustrates a PTE format in accordance with one embodiment. In one embodiment, the physical page address is stored in bits 39 to 12. In one embodiment, a page pointed to by the physical page address in PTE format 205 is 4 KB in size. Accordingly, there is one PTE for each 4 KB logical page of addressable memory. In other embodiments, a page pointed to by the physical page address in PTE format 205 can be any of various other sizes.

The write permissions field 210 and read permissions field 215 are shown in PTE format 205. In one embodiment, when both of these fields are set to "0", this indicates that the page pointed to by the entry is in page migration state. For example, PTE format for page migration state 220 is shown in the middle of FIG. 2 to illustrate the values for the write and read permissions fields for an entry pointing to a page which will be migrated between memory locations. Entry 220 also includes address 225 and the other fields shown in PTE format 205. It is noted that in other embodiments, other ways of encoding a page migration state indication within a PTE are possible and are contemplated.

An example of a PTE format in accordance with another embodiment is shown at the bottom of FIG. 2 as PTE format 235. In PTE format 235, the T field 240 is used to indicate if the corresponding page has read permissions. The use of T field 240 to encode read permissions in PTE format 235 enables the migration of write-only pages. In one embodiment, if the T field 240 is set to one, then the corresponding page has read permissions. Otherwise, if the T field 240 is set to zero, then the corresponding page does not have read permissions. In one embodiment, when the R and W fields are equal to zero for a given page (i.e., the given page is in the page migration state), reads are allowed to the given page if the T field 240 is set to one. However, if the R and W fields are equal to zero for a given page, reads are blocked to the given page if the T field 240 is set to zero. It is noted that in other embodiments, other suitable PTE formats can be utilized which differ from those shown in FIG. 2.

Figure 3:
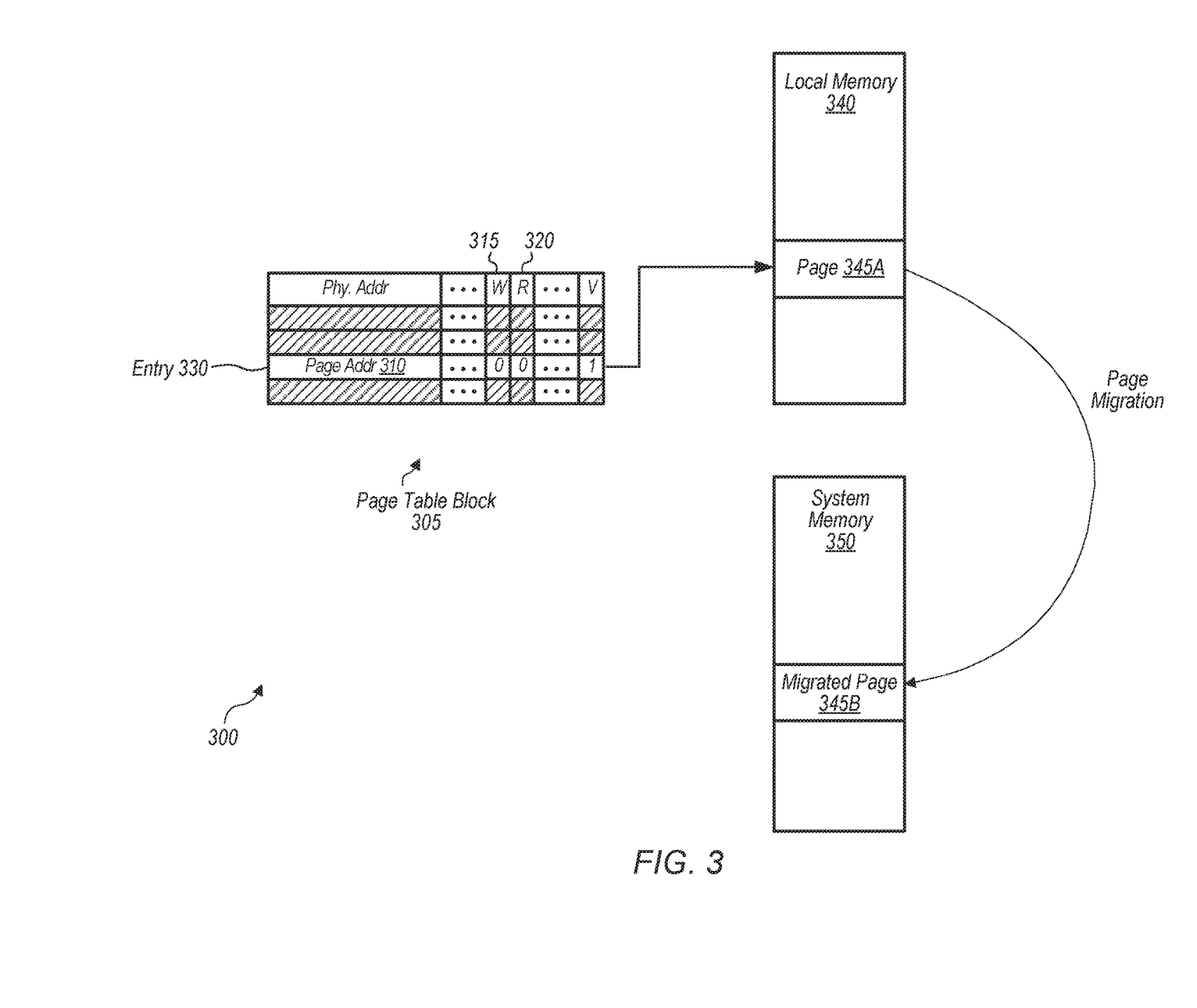
FIG. 3 is a block diagram of one embodiment of a system with a page migration in progress.

Referring now to FIG. 3, a block diagram of one embodiment of a system 300 with a page migration in progress is shown. Page table entry 330 is shown in page table block 305, and entry 330 includes at least a page address 310, write permissions field 315 and read permissions field 320. As shown in entry 330, write permissions field 315 and read permissions field 320 are both set to zero. In one embodiment, this indicates that the page 345A pointed to by entry 330 is in a page migration state. In other embodiments, other ways of encoding that the corresponding page is in a page migration state can be utilized. Prior to the page migration, page 345A is stored in local memory 340. It is assumed for the purposes of this discussion that page 345A is being migrated to system memory 350. This is shown as migrated page 345B in system memory 350. In other embodiments, page 345A can be migrated to other locations. For example, page 345A can be migrated to another location within local memory 340 or to another memory besides system memory 350.

In one embodiment, when a translation request hits entry 330, a subsequent memory request to page address 310 will be allowed to proceed if the memory request is a read request. The read request will then be performed to page 345A of local memory 340. Otherwise, if the memory request is a write request, a silent retry request will be generated and sent to the requesting client. The write request will not be allowed to proceed at this point in time. The client can retry the write request at a later point in time, and if the page migration has been completed when another translation request is processed for the retried write request, then the write request will be allowed to continue.

Figure 4:
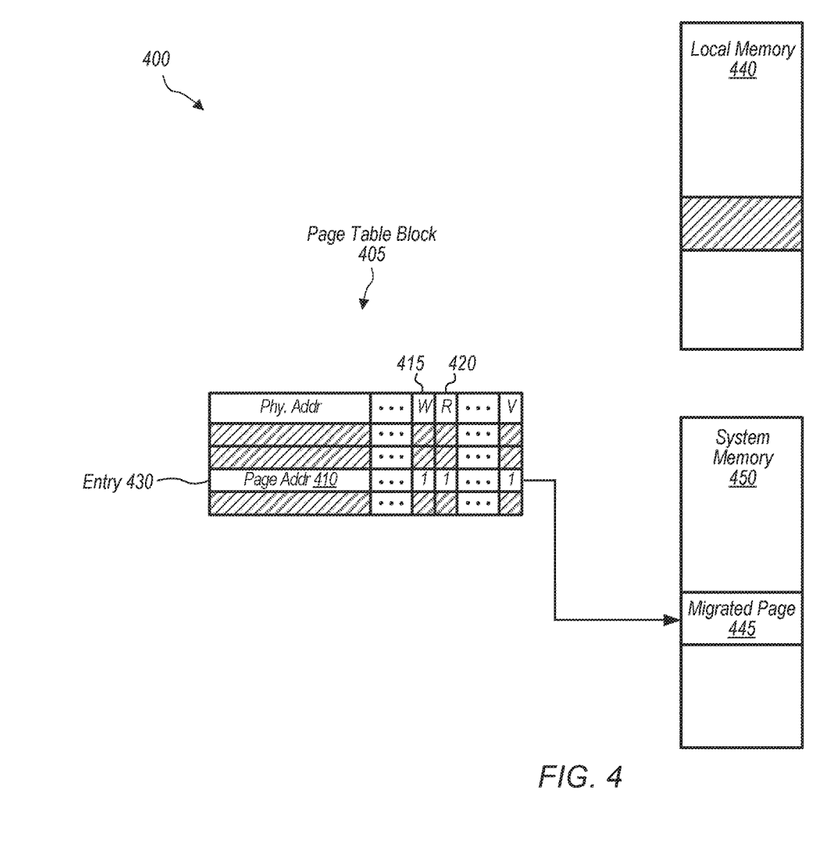
FIG. 4 is a block diagram of one embodiment of a system after a page migration has completed.

Turning now to FIG. 4, a block diagram of one embodiment of a system 400 after the completion of a page migration. Page table block 405, local memory 440, and system memory 450 of system 400 are intended to represent page table block 305, local memory 340, and system memory 350, respectively, of system 300 (of FIG. 3) at a later point in time after the page migration operation has been completed for migrated page 445 which is now located at address 410. Accordingly, the write permissions field 415 and read permissions field 420 of entry 430 are both set to one to indicate the page migration has been completed and write and read permissions have been restored to migrated page 445. Alternatively, if the migrated page 445 only has write privileges or read privileges, then only one of these fields will be set following completion of the page migration. If a translation request targeting migrated page 445 is received by page table block 405, then the translation request and subsequent memory request will be processed in a typical fashion in response to detecting that either write or read permissions are enabled in entry 430.

Figure 5:
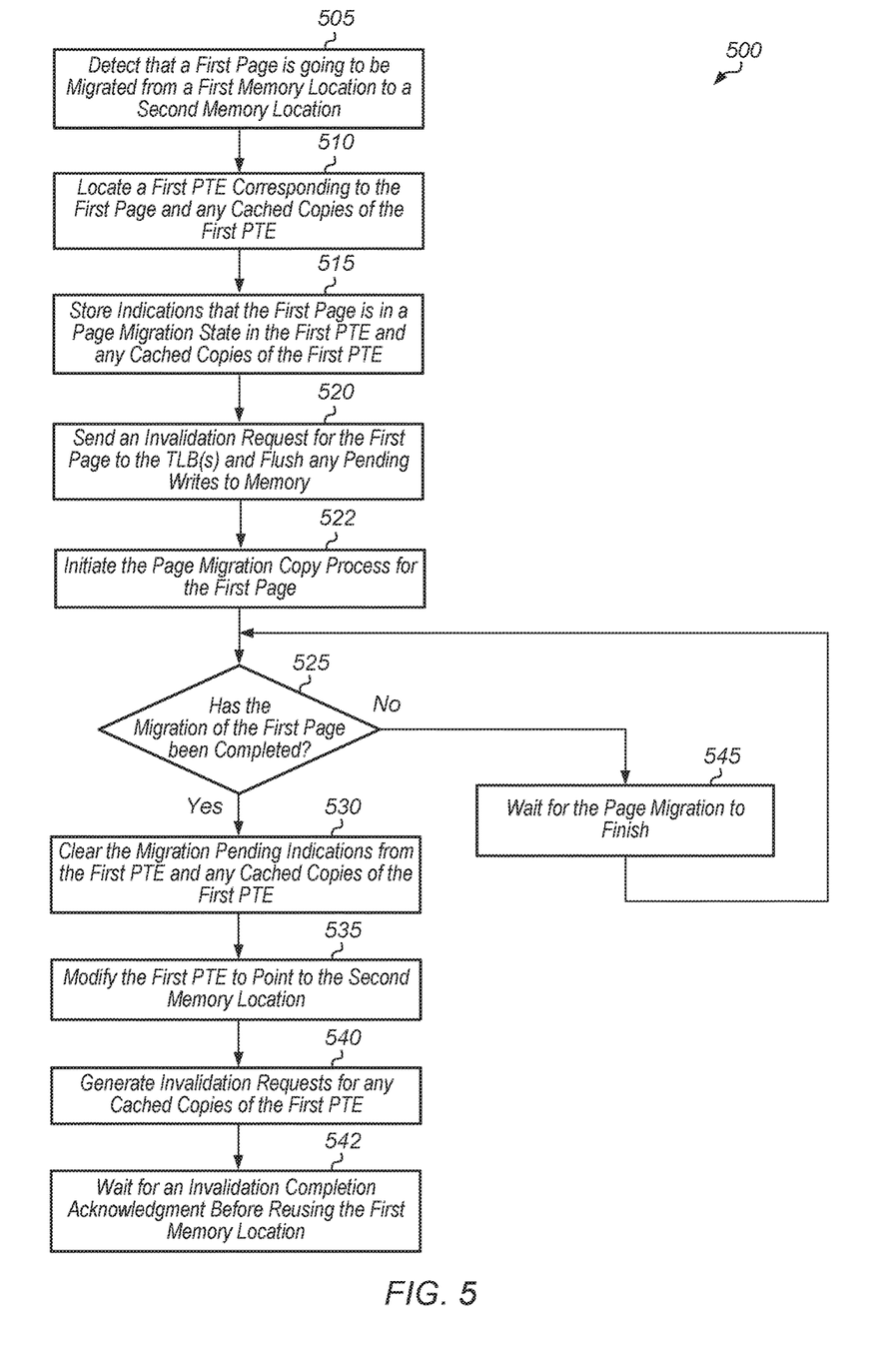
FIG. 5 is a generalized flow diagram illustrating one embodiment of a method for migrating a first page between memory locations.
Figure 6:
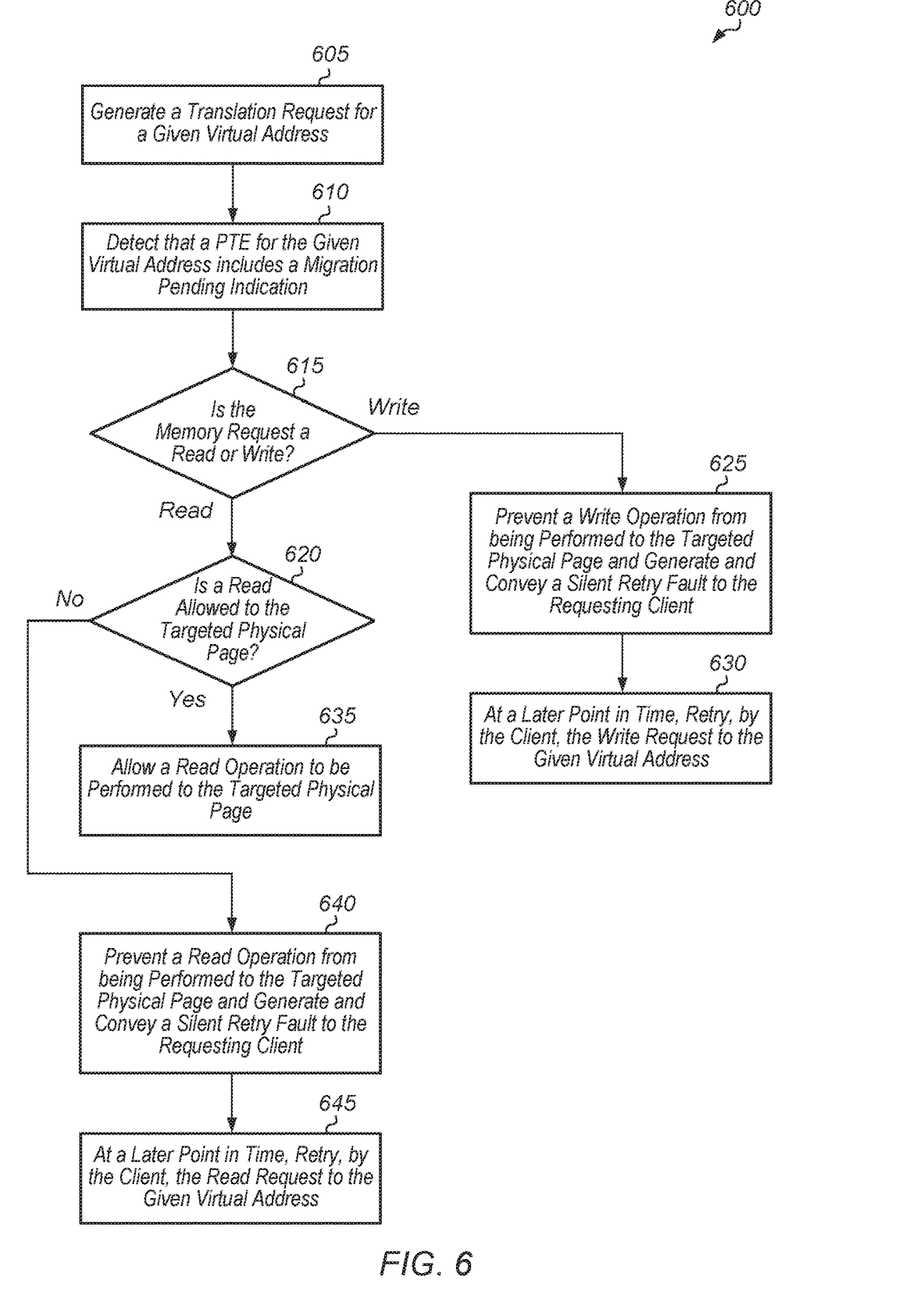
FIG. 6 is a generalized flow diagram illustrating one embodiment of a method for processing a translation request that hits a PTE with a migration pending indication.
Figure 7:
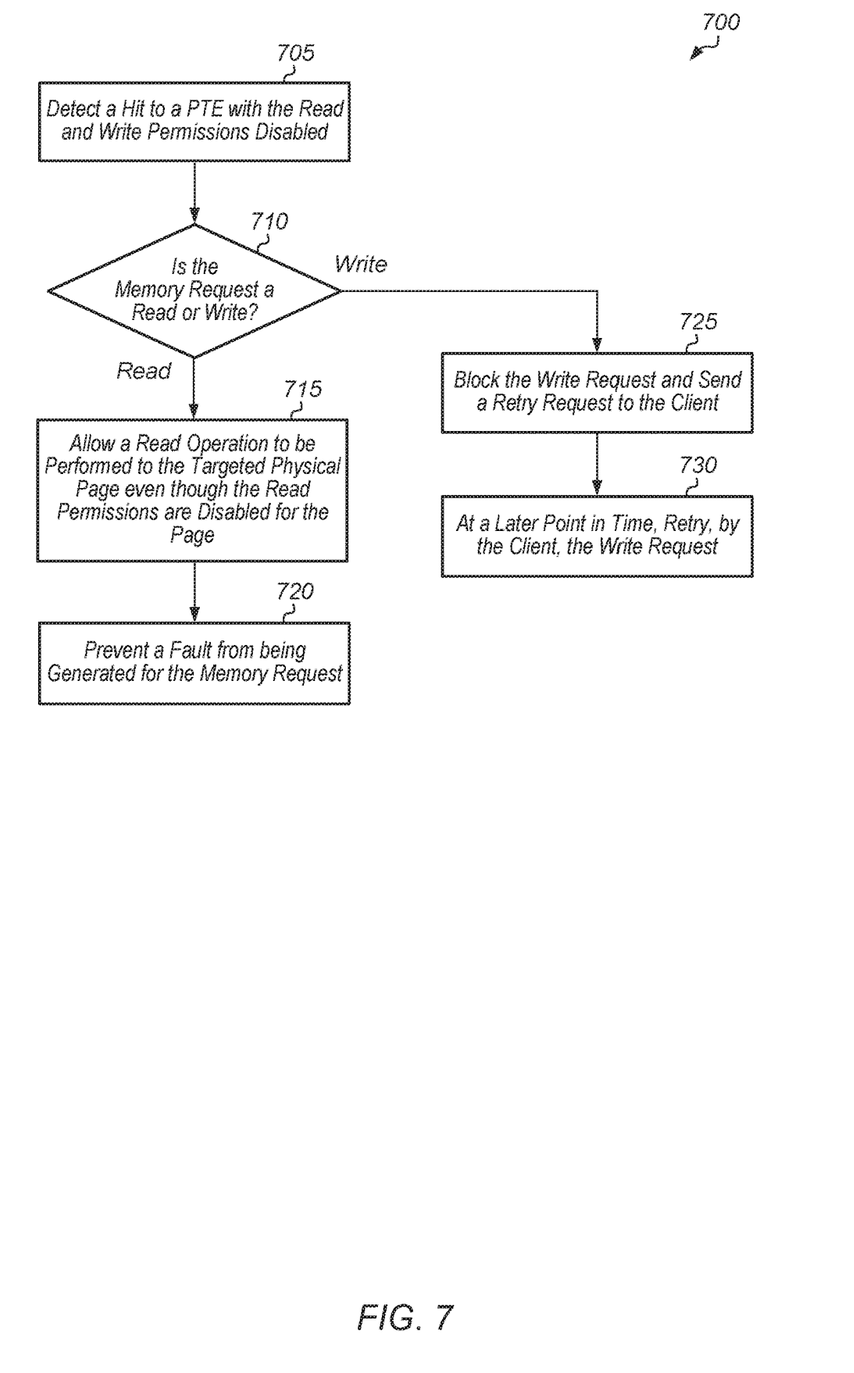
FIG. 7 is a generalized flow diagram illustrating one embodiment of a method for processing translation requests.

Referring now to FIG. 5, one embodiment of a method 500 for migrating a first page between memory locations is shown. For purposes of discussion, the steps in this embodiment and those of FIGS. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

An indication that a first page is going to be migrated from a first memory location to a second memory location is detected (block 505). In one embodiment, the first memory location is in a first memory (e.g., local memory) and the second memory location is in a second memory (e.g., global memory). In another embodiment, the first and second memory locations are both located within a single memory.

Next, a first page table entry (PTE) corresponding to the first page and any cached copies of the first PTE are located (block 510). Indications that the first page is in a page migration state are stored in the first PTE and any cached copies of the first PTE (block 515). In one embodiment, the indication is encoded in the PTE by disabling the read and write permissions for the first page. In other embodiments, other ways of encoding the migration pending indication in the first PTE can be utilized. Also, an invalidation request for the first page is sent to the TLB(s) and any pending writes to memory are flushed (block 520). Once the pending writes to memory have been resolved, then the page migration copy process for the first page can be initiated (block 522).

If the migration of the first page has been completed (conditional block 525, "yes" leg), then the migration pending indications are cleared from the first PTE and any cached copies of the first PTE (block 530). Also, the first PTE is modified to point to the second memory location where the first page has been migrated (block 535). Still further, invalidation requests are generated for any cached copies of the first PTE (block 540). Then, the system waits for an invalidation completion acknowledgment before reusing the first memory location (block 542). After block 542, method 500 ends. If the migration of the first page has not yet been completed (conditional block 525, "no" leg), then the system waits for the page migration to finish (block 545) and then returns to conditional block 525.

Turning now to FIG. 6, one embodiment of a method 600 for processing a translation request that hits a PTE with a migration pending indication is shown. A processor generates a translation request for a given virtual address (block 605). In one embodiment, the processor is part of a system (e.g., system 100 of FIG. 1) that includes at least one processor, a MMU, and a memory subsystem. The system can also include any number of other components depending on the embodiment. The MMU detects that a PTE for the given virtual address includes a migration pending indication (block 610). If the memory request targeting the given virtual address is a read request (conditional block 615, "read" leg), then it is determined if a read is allowed to the targeted physical page (conditional block 620). In one embodiment, whether or not reads are allowed to the targeted physical page can be under programmable control. If a read is allowed to the targeted physical page (conditional block 620, "yes" leg), then a read operation is allowed to be performed to the targeted physical page (block 635). After block 635, method 600 ends. If a read is not allowed to the targeted physical page (conditional block 620, "no" leg), then the read operation is prevented from being performed to the targeted physical page and a silent retry fault is generated and conveyed to the requesting client (block 640). At a later point in time, the client retries the read request to the given virtual address (block 645). After block 645, method 600 ends.

If the memory request targeting the virtual address is a write request (conditional block 615, "write" leg), then a write operation is prevented from being performed to the targeted physical page and a silent retry fault is generated and conveyed to the requesting client (block 625). In one embodiment, the silent retry fault is referred to as "silent" since the fault does not include generating an interrupt or updating status registers. The silent retry fault indicates to the client that they should retry the write request at a later point in time. At a later point in time, the client will retry the write request to the virtual address (block 630). Once the migration has been completed, the write request will be performed to the physical page at the new location. After block 630, method 600 ends.

Referring now to FIG. 7, one embodiment of a method 700 for processing translation requests is shown. A hit is detected to a page table entry (PTE) with the read and write permissions disabled (block 705). In one embodiment, when the read and write permissions are disabled for a PTE, this indicates that the corresponding physical page is currently being migrated between memory locations. If a subsequent memory request is a read request (conditional block 710, "read" leg), then the read request is allowed to be performed to the targeted physical page even though read permissions are disabled for the page (block 715). Also, the system software prevents a fault from being generated for the memory request (block 720). After block 720, method 700 ends. If the subsequent memory request is a write request (conditional block 710, "write" leg), then a retry request is sent to the client and the write request is blocked (block 725). At a later point in time, the client can retry the write request (block 730). After block 730, method 700 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory subsystem; and
a processor coupled to the memory subsystem;
wherein the system is configured to:
   detect that a first page will be migrated from a first memory location to a second memory location in the memory subsystem;
   locate a first page table entry (PTE) corresponding to the first page;
   store a migration pending indication in the first PTE; and
   in response to detecting a translation request corresponding to a write request which targets the first PTE and detecting the migration pending indication in the first PTE, prevent the write operation from being performed to the first page and generate a silent retry request.

2. The system as recited in claim 1, wherein responsive to detecting a translation request which targets the first PTE and detecting the migration pending indication in the first PTE, the system is configured to:
   if the translation request corresponds to a read request targeting the first page, allow a read operation to be performed to the first page.

3. The system as recited in claim 2, wherein in response to detecting the translation request corresponding to the write request which targets the first PTE and detecting the migration pending indication in the first PTE, a page fault is not generated.

4. The system as recited in claim 3, wherein the requesting client is configured to retry the write request at a later point in time.

5. The system as recited in claim 1, wherein the migration pending indication is encoded in the first PTE by disabling read and write permissions of the first PTE.

6. The system as recited in claim 1, wherein responsive to the migration of the first page from the first memory location to the second memory location being completed, the system is configured to:
   clear the migration pending indication; and
   generate an invalidation request for any cached translations corresponding to the first PTE.

7. The system as recited in claim 1, wherein:
   the memory subsystem comprises a first memory and a second memory;
   the first memory location is in the first memory; and
   the second memory location is in the second memory.

8. A method comprising:
   detecting by a computing system that a first page will be migrated from a first memory location to a second memory location;
   locating a first page table entry (PTE) corresponding to the first page;

storing a migration pending indication in the first PTE; and preventing a write operation from being performed to the first page and generating a silent retry request without generating an interrupt, responsive to detecting a translation request corresponding to a write request which targets the first PTE and detecting the migration pending indication in the first PTE.

9. The method as recited in claim 8, wherein responsive to detecting a translation request which targets the first PTE and detecting the migration pending indication in the first PTE, the method further comprises:

if the translation request corresponds to a read request targeting the first page, allowing a read operation to be performed to the first page.

10. The method as recited in claim 9, wherein in response to detecting the translation request corresponding to the write request which targets the first PTE and detecting the migration pending indication in the first PTE, a page fault is not generated.

11. The method as recited in claim 10, further comprising the requesting client retrying the write request at a later point in time.

12. The method as recited in claim 8, wherein the migration pending indication is encoded in the first PTE by disabling read and write permissions of the first PTE.

13. The method as recited in claim 8, wherein responsive to the migration of the first page from the first memory location to the second memory location being completed, the method further comprising:

clearing the migration pending indication; and generating an invalidation request for any cached translations corresponding to the first PTE.

14. The method as recited in claim 8, wherein the first memory location is in a first memory, and wherein the second memory location is in a second memory.

15. An apparatus comprising:

a memory subsystem; and a memory management unit (MMU);

wherein the MMU is configured to:

detect that a first page will be migrated from a first memory location to a second memory location in the memory subsystem;

locate a first page table entry (PTE) corresponding to the first page;

store a migration pending indication in the first PTE; and prevent a write operation from being performed to the first page and generate a silent retry request without generating an interrupt, responsive to detecting a translation request corresponding to a write request which targets the first PTE and detecting the migration pending indication in the first PTE.

16. The apparatus as recited in claim 15, wherein responsive to detecting a translation request which targets the first PTE and detecting the migration pending indication in the first PTE, the MMU is configured to:

if the translation request corresponds to a read request targeting the first page, allow a read operation to be performed to the first page.

17. The apparatus as recited in claim 16, wherein in response to detecting the translation request corresponding to the write request which targets the first PTE and detecting the migration pending indication in the first PTE, a page fault is not generated.

18. The apparatus as recited in claim 17, wherein the requesting client is configured to retry the write request at a later point in time.

19. The apparatus as recited in claim 15, wherein the migration pending indication is encoded in the first PTE by disabling read and write permissions of the first PTE.

20. The apparatus as recited in claim 15, wherein responsive to the migration of the first page from the first memory location to the second memory location being completed, the apparatus is configured to:

clear the migration pending indication; and generate an invalidation request for any cached translations corresponding to the first PTE.

* * * * *